United States Patent
Yamanoi et al.

(10) Patent No.: US 10,290,875 B2
(45) Date of Patent: *May 14, 2019

(54) ELECTRODE MATERIAL AND SECONDARY CELL

(71) Applicant: Murata Manufacturing Co., Ltd., Kyoto (JP)

(72) Inventors: Shun Yamanoi, Kanagawa (JP); Seiichiro Tabata, Kanagawa (JP); Hironori Iida, Kanagawa (JP); Kenji Kishimoto, Kanagawa (JP); Yosuke Saito, Tokyo (JP); Shinichiro Yamada, Kanagawa (JP); Kazumasa Takeshi, Kanagawa (JP); Koichiro Hinokuma, Kanagawa (JP)

(73) Assignee: MURATA MANUFACTURING CO., LTD. (JP)

( * ) Notice: Subject to any disclaimer, the term of this patent is extended or adjusted under 35 U.S.C. 154(b) by 484 days.

This patent is subject to a terminal disclaimer.

(21) Appl. No.: 14/905,135

(22) PCT Filed: May 20, 2014

(86) PCT No.: PCT/JP2014/063361
§ 371 (c)(1),
(2) Date: Jan. 14, 2016

(87) PCT Pub. No.: WO2015/011970
PCT Pub. Date: Jan. 29, 2015

(65) Prior Publication Data
US 2016/0164104 A1 Jun. 9, 2016

(30) Foreign Application Priority Data

Jul. 25, 2013 (JP) .................... 2013-154580

(51) Int. Cl.
*H01M 4/583* (2010.01)
*H01M 4/62* (2006.01)
(Continued)

(52) U.S. Cl.
CPC ............ *H01M 4/663* (2013.01); *H01M 4/13* (2013.01); *H01M 4/139* (2013.01); *H01M 4/38* (2013.01);
(Continued)

(58) Field of Classification Search
None
See application file for complete search history.

(56) References Cited

U.S. PATENT DOCUMENTS

2010/0069507 A1* 3/2010 Tabata .................... B01J 20/20
514/769

FOREIGN PATENT DOCUMENTS

JP S62-076155 3/1987
JP 4-359861 A 12/1992
(Continued)

OTHER PUBLICATIONS

International Search Report prepared by the Japanese Patent Office dated Jun. 30, 2014, for International Application No. PCT/JP2014/063361.
(Continued)

*Primary Examiner* — Jonathan Crepeau
(74) *Attorney, Agent, or Firm* — Sheridan Ross P.C.

(57) ABSTRACT

An electrode material for a secondary cell includes a porous carbon material having an absolute value of a differential value of a mass using a temperature as a parameter exceeding 0 at 360° C. and being 0.016 or more at 290° C. provided by thermally analyzing a mixture of the porous carbon material and $S_8$ sulfur at a mass ratio of 1:2.

6 Claims, 3 Drawing Sheets

(51) Int. Cl.
- *H01M 4/38* (2006.01)
- *H01M 4/66* (2006.01)
- *H01M 4/13* (2010.01)
- *H01M 4/139* (2010.01)
- *H01M 10/052* (2010.01)

(52) U.S. Cl.
CPC .......... *H01M 4/583* (2013.01); *H01M 4/625* (2013.01); *H01M 10/052* (2013.01)

(56) References Cited

FOREIGN PATENT DOCUMENTS

| | | |
|---|---|---|
| JP | H05-258743 | 10/1993 |
| JP | 8-97101 A | 4/1996 |
| JP | 9-161801 A | 6/1997 |
| JP | 2006-114507 A | 4/2006 |
| JP | 2007-320842 | 12/2007 |
| JP | 2008-273816 A | 11/2008 |
| JP | 2010-257689 | 11/2010 |
| JP | 2011-518743 A | 6/2011 |
| JP | 2014-35915 A | 2/2014 |
| JP | 2007-207535 | 8/2017 |
| WO | WO 96/27911 | 9/1996 |
| WO | WO 2010/035828 A1 | 4/2010 |

OTHER PUBLICATIONS

Tachikawa et al, "Reversibility of electrochemical reactions of sulfur supported on inverse opal carbon in glyme-Li salt molten complex electrolytes"; Chem. Commun., 47, 8157-8159 (2011).

Ji et al, "A highly ordered nanostructured carbon-sulphur cathode for lithium-sulphur batteries"; Nature Materials, vol. 8, Jun. 2009, pp. 500-506.

Official Action (no English translation available) for Japanese Patent Application No. 2013-154580 dated Mar. 21, 2017, 6 pages.

Official Action (no English translation available) for Japanese Patent Application No. 2013-154580 dated Dec. 19, 2017, 5 pages.

* cited by examiner

ELECTRODE MATERIAL AND SECONDARY CELL

CROSS REFERENCE TO RELATED APPLICATIONS

This application is a national stage application under 35 U.S.C. 371 and claims the benefit of PCT Application No. PCT/JP2014/063361 having an international filing date of May 20, 2014, which designated the United States, which PCT application claimed the benefit of Japanese Patent Application No. 2013-154580 filed Jul. 25, 2013 the disclosures of which are incorporated herein by reference in their entirety.

TECHNICAL FIELD

The present disclosure relates to an electrode material and a secondary cell.

BACKGROUND ART

A lithium-sulfur secondary cell using a sulfur substance as a cathode active material and lithium (Li) as an anode active material has been developed. Theoretical capacity densities of lithium and sulfur are about 3862 mAh/g and about 1672 mAh/g, respectively. It is supposed to provide a secondary cell having a very high energy density. However, there are the reasons why the lithium-sulfur secondary cell is not practically used at present:
(1) A utilization ratio of sulfur as the cathode active material is low.
(2) A charge-discharge cycle property is low.
It cannot fully utilize a significantly great theoretical capacity density characterized in the lithium-sulfur secondary cell.

One of the reasons for (1) may be as follows: Upon discharge, lithium ions are reacted with $S_8$ sulfur in the cathode to generate sulfide $Li_2S_x$. If the reaction proceeds, the value of x is changed from 8 to 4, 2, or 1. Here, if the value of x is 8, 4, or 2, sulfide $Li_2S_x$ is partly dissolved in an electrolyte. Then, if the reaction proceeds, and the sulfide dissolved becomes $Li_2S$ (i.e., x=1), the sulfide is not dissolved in the electrolyte, and precipitated to damage the electrode. Therefore, at present, only the sulfide having the value x of up to about 2 (theoretical capacity density: 836 mAh/g) can be used for discharge.

In relation to (2), the reason may be that sulfur (for example, $S_8$ sulfur) is an insulator having electrical resistivity of $10^{-30}$ $\Omega \cdot cm^{-1}$, and that polysulfide is eluted in electrolyte. Furthermore, the polysulfide eluted in the electrolyte is reduced at an anode during charging, and polysulfide having shorter sulfur chains are generated, migrates to a cathode and is oxidized again, which is called as a redox shuttle reaction. Due to the redox shuttle reaction, the cut-off voltage is not reached, and an overcharge state is induced.

Patent Document 1: Japanese Patent Application Laid-open No. 2010-257689
Non-Patent Document 1: L. Nazar et.al., Nature Materials, 8, 500, 2009
Non-Patent Document 2: M. Watanabe et.al., Chem.Commun., 47, 8157-8159 (2011)

SUMMARY OF INVENTION

Problem to be Solved by the Invention

To solve the above-described problems, there may be a method to insert sulfur into a porous carbon material. In this way, a conductive substance may be present near a sulfur component, and electrons are easily migrated. Also, sulfur may be held in spaces in the porous carbon material, sulfur is reacted with lithium ions within the spaces, and therefore the sulfide generated may be prevented from outflowing. As the porous carbon material, Ketjen black, which is a hollow nano-carbon material having a graphene layer; carbon black; or acetylene black is generally used (for example, see Japanese Patent Application Laid-open No. 2010-257689). As other porous carbon material, there are known a system of holding sulfur within spaces of rod-like nano-carbon (see L. Nazar et.al., Nature Materials, 8, 500, 2009), and a system of holding sulfur in inverse opal carbon (see M. Watanabe et.al., Chem. Commun., 47, 8157-8159 (2011)). However, the porous carbon material having both of conductivity and optimal spaces (size, volume) is few in number. The optimal spaces are less discussed.

Therefore, an object of the present disclosure is to provide an electrode material for a secondary cell having an excellent charge-discharge cycle property where a utilization ratio of an active material is improved, and a secondary cell using the electrode material.

Means for Solving the Problem

An electrode material for a secondary cell of a first embodiment according to the present disclosure for solving the object includes a porous carbon material having an absolute value of a differential value of a mass using a temperature as a parameter ($|-d(TG)/dt|$) exceeding 0 at 360° C. and being 0.016 or more at 290° C. provided by thermally analyzing a mixture of the porous carbon material and $S_8$ sulfur at a mass ratio of 1:2.

An electrode material for a secondary cell of a second embodiment according to the present disclosure for solving the object includes a porous carbon material having an absolute value of a differential value of a mass using a temperature as a parameter ($|-d(TG)/dt|$) exceeding 0 provided by thermally analyzing a mixture of the porous carbon material and $S_8$ sulfur at a mass ratio of 1:2 at a temperature where an absolute value of a differential value of a mass using a temperature as a parameter ($|-d(TG)/dt|_{KB}$) being 0 provided by thermally analyzing a mixture of Ketjen black and $S_8$ sulfur at a mass ratio of 1:2.

An electrode material for a secondary cell of a third embodiment according to the present disclosure for solving the object includes a porous carbon material having an absolute value of a differential value of a mass using a temperature as a parameter ($|-d(TG)/dt|$) being 0.01 or more at 325° C. provided by thermally analyzing a mixture of the porous carbon material and $S_8$ sulfur at a mass ratio of 1:2.

A secondary cell including an electrode material of a first embodiment according to the present disclosure for solving the object includes a porous carbon material having an absolute value of a differential value of a mass using a temperature as a parameter ($|-d(TG)/dt|$) exceeding 0 at 360° C. and being 0.016 or more at 290° C. provided by thermally analyzing a mixture of the porous carbon material and $S_8$ sulfur at a mass ratio of 1:2.

A secondary cell including an electrode material of a second embodiment according to the present disclosure for solving the object includes a porous carbon material having an absolute value of a differential value of a mass using a temperature as a parameter ($|-d(TG)/dt|$) exceeding 0 provided by thermally analyzing a mixture of the porous carbon material and $S_8$ sulfur at a mass ratio of 1:2 at a temperature where an absolute value of a differential value of a mass using a temperature as a parameter $(|-d(TG)/dt|)_{KB}$ being 0 provided by thermally analyzing a mixture of Ketjen black and $S_8$ sulfur at a mass ratio of 1:2.

A secondary cell including an electrode material of a third embodiment according to the present disclosure for solving the object includes a porous carbon material having an absolute value of a differential value of a mass using a temperature as a parameter $(|-d(TG)/dt|)$ being 0.01 or more at 325° C. provided by thermally analyzing a mixture of the porous carbon material and $S_8$ sulfur at a mass ratio of 1:2.

Effects of the Invention

In the electrode material for the secondary cell and the secondary cell of the first to third embodiments according to the present disclosure, a thermal behavior of the mixture of the porous carbon material and $S_8$ sulfur is defined. In other words, even when a heat is applied, sulfur is difficult to be separated from the mixture of the porous carbon material and $S_8$ sulfur. Therefore, the porous carbon material can surely hold the active material within the pores, and can prevent a reaction product of the active material within the spaces from outflowing from the pores to outside, thereby improving the utilization ratio of the active material and providing an excellent charge-discharge cycle property. The effects described in the specification are only illustrative and should not be limited, and any additional effects may be provided.

MODE(S) FOR CARRYING OUT THE INVENTION

Hereinafter, embodiments according to the present disclosure will be described with reference to the drawings. The present disclosure is not limited to the embodiments, and a variety of numerical values and materials in the embodiments are illustrative. The embodiments according to the present disclosure will be described in the following order.
1. Electrode Material and Secondary Cell according to First to Third Embodiments of Present Disclosure, General Description
2. Example 1 (Electrode Material and Secondary Cell according to First to Third Embodiments of Present Disclosure)
3. Example 2 (Alternative of Example 1), Others

[Electrode Material and Secondary Cell According to First to Third Embodiments of Present Disclosure, General Description]

Hereinafter, an electrode material for a secondary cell of a first embodiment according to the present disclosure and a secondary cell of a first embodiment according to the present disclosure may be collectively referred simply to as "the first embodiment according to the present disclosure". An electrode material for a secondary cell of a second embodiment according to the present disclosure and a secondary cell of a second embodiment according to the present disclosure may be collectively referred simply to as "the second embodiment according to the present disclosure". An electrode material for a secondary cell of a third embodiment according to the present disclosure and a secondary cell of a third embodiment according to the present disclosure may be collectively referred simply to as "the third embodiment according to the present disclosure". The first to third embodiments may be collectively referred simply to as "the present disclosure".

In the present disclosure including the above-descried desirable embodiments, the porous carbon material uses a plant-derived material containing 5% by mass or more of silicon (Si) as a raw material. Such a raw material may be called as a "silicon-containing plant-derived raw material" as a matter of convenience. The porous carbon material provided based on the silicon-containing plant-derived raw material may be called as a "silicon-containing plant-derived porous carbon material". A content of silicon (Si) of the porous carbon material is less than 5% by mass, desirably 3% by mass or less, more desirably 1% by mass or less.

Alternatively, in the present disclosure including the above-described desirable embodiments, the porous carbon material desirably uses peat or a wood-based material (specifically, for example, sawdust and coconut shell) as the raw material. The wood-based material is mainly used as medicinal charcoal.

If the peat (also called as grass peat) is used as the raw material of the porous carbon material, the porous carbon material may be provided by heating the peat under an inactive gas (such as nitrogen gas and argon gas) or vacuum at a high temperature, and may be further activated. The peat may be pre-treated such as washing (to elute a variety of minerals) after heating at a high temperature. The peat may be pulverized as desired to have a desired grain size, or may be classified. The peat may be washed in advance. Alternatively, the porous carbon material provided or the porous carbon material activated may be pulverized as desired to have a desired grain size, or may be classified. Examples of an activation method include a gas activation method and a chemical activation method. These activation methods will be described later.

The wood-based material is desirably activated. The wood-based material may be pulverized as desired to have a desired grain size, or may be further classified. After the activation, the wood-based material may be pulverized as desired to have a desired grain size, or may be classified. Examples of the activation method include a gas activation method and a chemical activation method as described later.

In the present disclosure including the above-descried desirable embodiments, the porous carbon material desirably has a value of a specific surface area of 10 $m^2$/g or more by a nitrogen BET method, and has a pore volume of 0.1 $cm^3$/g or more by a BJH method and an MP method.

Furthermore, in the present disclosure including the above-descried desirable embodiments, the porous carbon material has a half-value width of 5 degrees or less based on a diffraction angle of 2θ in a diffraction intensity peak of a (100) face or a (101) face by an X ray diffractometry.

Figure 3:
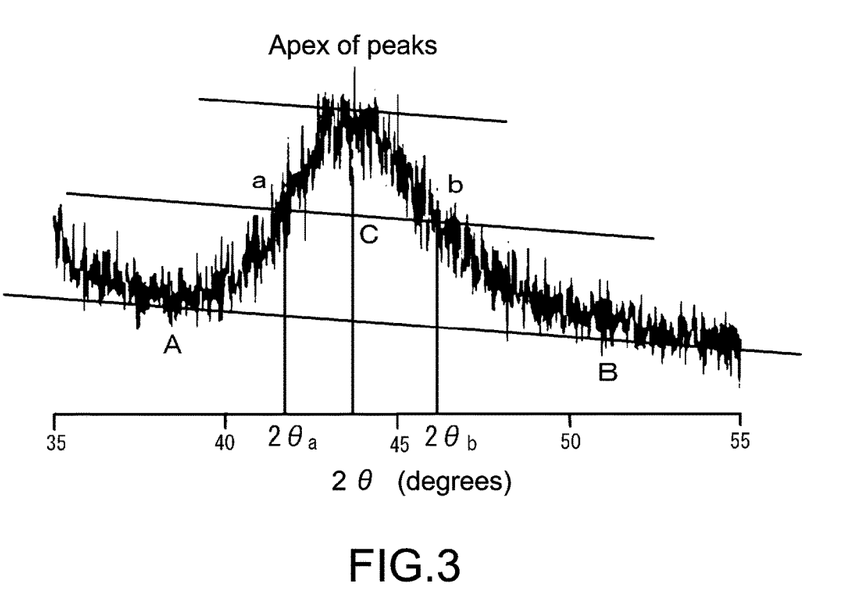
FIG. 3 is a graph illustrating a method of determining a half-value width in a diffraction intensity peak of a (100) face or a (101) face in a measurement result of an X ray diffraction intensity of the porous carbon material.

In the X ray diffractometry, a Cu-Kα line (wavelength: 0.15045 nm) is used as an X ray source, an applied voltage is set to 50 kV, and a scanning speed is set to 5°/min. Measurement is made at the diffraction angle 2θ of from 10° to 60°. One example of a measurement result of the diffraction intensity is shown in FIG. 3. Between the diffraction angle 2θ of from 35° to 40°, the diffraction angle where the diffraction intensity shows a minimum value is determined as "A". Between the diffraction angle 2θ of from 50° to 55°, a straight line be in contact with the diffraction intensity being A as a starting point is determined as a base line AB. The diffraction intensity (peak height) from the base line AB to the diffraction intensity peak of the (100) face or the (101) face is defined as "100". Points "a" and "b" are determined on the straight line passing a point C where the diffraction intensity is "50" and being in parallel with the base line that intersects the diffraction intensity peak of the (100) face or the (101) face. Then, diffraction angles $2θ_a$, $2θ_b$ corresponding to the points "a", b" are determined, and $(2θ_b-2θ_a)$ is further determined. The value of the $(2θ_b-2θ_a)$ is a half-value width in the diffraction intensity peak of the (100) face or the (101) face.

By specifying the value of the half-value width of the porous carbon material in the diffraction intensity peak of the (100) face or the (101) face by the X-ray spectrometry, there can be provided a porous carbon material having excellent conductivity, and a secondary cell using the porous carbon material as electrodes can improve a utilization ratio of an active material and have an excellent charge-discharge cycle property.

Furthermore, in each secondary cell according to the first to third embodiments according to the present disclosure including above-described desirable embodiments, a cathode can be configured of the electrode. In addition, a lithium-sulfur secondary cell is provided, and each electrode can support sulfur or a sulfur compound. A configuration and a structure of the secondary cell may be well-known. Example of sulfur may include $S_8$ sulfur. Examples of the sulfur compound may include insoluble sulfur, colloidal sulfur, an organic sulfur compound (such as a disulfide compound and a trisulfide compound). The cathode may be produced by slurrying sulfur or the sulfur compound, the porous carbon material and other materials, and applying the slurry to a substrate of the cathode, for example. Alternatively, a liquid infiltration method, a solution infiltration method, a PVD method, a CVD method, etc. can be used.

In the present disclosure, a mixture of the porous carbon material and $S_8$ sulfur at a mass ratio of 1:2 is thermally analyzed. Here, $S_8$ sulfur manufactured by Wako Pure Chemical Industries, Ltd. (manufacturer's code 194-05712) is used. Then, 0.3000 grams of the porous carbon material and 0.6000 grams of $S_8$ sulfur are pulverized and mixed within an agate mortar for 30 minutes, and are heated at 155° C. for 3 hours. After the mixture is cooled to a room temperature, thermo scanning gravimetry (TG measurement) is conducted, for example, using "ThermoPlus" manufactured by Rigaku Corporation. Specifically, the TG measurement is conducted at from a room temperature to 550° C. under nitrogen atmosphere and at a temperature increase speed of 5° C./min.

In the first to third embodiments according to the present disclosure, it does not specify that the electrode material for the secondary cell and the electrode are configured of the mixture of the porous carbon material and $S_8$ sulfur at a mass ratio of 1:2, but it specifies that the porous carbon material where the numerical value provided when the mixture of the porous carbon material and $S_8$ sulfur at a mass ratio of 1:2 is thermally analyzed satisfies the requirement of the first to third embodiments according to the present disclosure is used as the electrode material for the secondary cell and the electrode.

As the "Ketjen black" in the second embodiment according to the present disclosure, product name "carbon ECP" (product name "Ketjen black EC300J" pulverized) manufacture by Lion Corporation may be used.

A variety of elements can be analyzed by Energy Dispersion Spectroscopy (EDS) using Energy dispersive X-ray spectrometry (for example, JED-2200F manufactured by JEOL Ltd.). Here, measurement conditions may be, for example: a scanning voltage of 15 kV, and an irradiation current of 10 μA.

In the present disclosure including the above-descried desirable embodiments, a silicon-containing plant-derived porous carbon material can be provided by carbonizing a silicon-containing plant-derived raw material at 400° C. to 1400° C., and then treating with acid or alkali. By the acid or alkali treatment, silicon components in the silicon-containing plant-derived raw material after the carbonization can be removed. In addition, after the acid or alkali treatment is conducted, activation may be conducted, or before the acid or alkali treatment is conducted, the activation may be conducted. The material provided by carbonizing the silicon-containing plant-derived raw material at 400° C. to 1400° C. before the acid or alkali treatment is conducted is called as a "silicon-containing plant-derived porous carbon material precursor" or a "carbonaceous material".

In a method of producing the electrode material of the first to third embodiments according to the present disclosure (hereinafter referred collectively and simply to as a "method of producing the electrode material according to the present disclosure"), after the acid or alkali treatment is conducted, the activation may be conducted, or after the activation is conducted, the acid or alkali treatment may be conducted, as described above. In the method of producing the electrode material according to the present disclosure including the desirable embodiments, the silicon-containing plant-derived raw material may be heated (pre-carbonized) at a temperature lower than a carbonization temperature (for example, 400° C. to 700° C.) with oxygen blocked before the silicon-containing plant-derived raw material is carbonized, although it depends on the silicon-containing plant-derived raw material used. In this manner, a tar component that will be generated during the carbonization can be extracted, which results in a decrease or removal of the tar component that will be generated during the carbonization. Oxygen can be blocked by providing an inactive gas atmosphere such as a nitrogen gas and an argon gas, or by providing a vacuum atmosphere, or steaming the silicon-containing plant-derived raw material in some way, for example. In addition, in the method of producing the electrode material according to the present disclosure, the silicon-containing plant-derived raw material may be immersed into an alcohol (such as methyl alcohol, ethyl alcohol and isopropyl alcohol) in order to decrease mineral components and water included in the silicon-containing plant-derived raw material, or to prevent an unusual odor from generating during the carbonization, although it depends on the silicon-containing plant-derived raw material used. In the method of producing the electrode material according to the present disclosure, the pre-carbonization may be conducted thereafter. Examples of the material that is desirably heated in an inactive gas include a plant that generates a large amount of pyroligneous acid (tar and light oil), for example. Examples of the material that is desirably pretreated with alcohol include marine algae including a large amount of iodine and a variety of minerals, for example.

In the method of producing the electrode material according to the present disclosure, the silicon-containing plant-derived raw material is carbonized at a temperature of from 400° C. to 1400° C. The carbonization herein generally means that an organic material (in the present disclosure, the silicon-containing plant-derived raw material) is heated to convert into the carbonaceous material (for example, see JIS M0104-1984). For the carbonization atmosphere, an oxygen-blocked atmosphere may be used. Specifically, there can be cited an vacuum atmosphere, an inactive gas atmosphere such as a nitrogen gas and an argon gas, an atmosphere of steaming the silicon-containing plant-derived raw material in some way. A temperature increase speed reaching the carbonization temperature may be, but not limited to, 1° C./min or more, desirably 3° C./min or more, still desirably 5° C./min or more under the above-described atmosphere. An upper limit of a carbonization time may be 10 hours, desirably 7 hours, more desirably 5 hours, but is not limited thereto. A lower limit of the carbonization time may be such that the silicon-containing plant-derived raw material is surely carnozized. The silicon-containing plant-derived raw material may be pulverized as desired to a desired grain size, or may be classified. The silicon-containing plant-derived raw material may be washed in advance. Alternatively, the silicon-containing plant-derived raw material provided may be pulverized as desired to have a desired grain size, or may be classified. Alternatively, the silicon-containing plant-derived porous carbon material activated may be pulverized as desired to have a desired grain size, or may be classified. A form, a configuration and a structure of a furnace used for the carbonization is not limited. The furnace may be a continuous type or a batch type.

In the method of producing the electrode material according to the present disclosure, micropores having a diameter of less than 2 nm (described later) can be increased by the activation, as described above. Examples of the activation method include a gas activation method and a chemical activation method.

The gas activation method is that oxygen, water vapor, carbon dioxide, air or the like is used as an activator, and the porous carbon material is heated at 700° C. to 1400° C., desirably 700° C. to 1000° C., more desirably 800° C. to 1000° C. for several tens minutes to several hours under the gas atmosphere to grow a microstructure by volatile components and carbon atoms of the porous carbon material. More specifically, a heating temperature of the activation may be selected as appropriate based on a type or a specification of the raw material of the porous carbon material, and a type or a concentration of the gas. The chemical activation method is to conduct the activation using zinc chloride, iron chloride, calcium phosphate, calcium hydroxide, magnesium carbonate, potassium carbonate or sulfuric acid instead of oxygen or water vapor used in the gas activation method, to wash with hydrochloric acid, to adjust a pH with an alkali solution, and to dry.

In the method of producing the electrode material according to the present disclosure, by the acid or alkali treatment, the silicon components in the silicon-containing plant-derived raw material after the carbonization are removed. Here, examples of the silicon components include silicon oxides such as silicon dioxide, silicon oxide and a salt of silicon oxide. In this way, by removing the silicon components in the silicon-containing plant-derived raw material after the carbonization, the silicon-containing plant-derived porous carbon material having a high specific area can be provided. In some cases, by a dry etching method, the silicon components in the silicon-containing plant-derived raw material after the carbonization may be removed. In other words, in a desirable form of the silicon-containing plant-derived porous carbon material, the silicon-containing plant-derived raw material including silicon (Si) is used as the raw material. When the silicon-containing plant-derived raw material is converted into the silicon-containing plant-derived porous carbon material precursor or the carbonaceous material, the silicon-containing plant-derived raw material is carbonized at a high temperature (for example, 400° C. to 1400° C.), whereby silicon included in the silicon-containing plant-derived raw material is not converted into silicon carbide (SiC), but is converted into a silicon component (silicon oxides) such as silicon dioxide ($SiO_x$), silicon oxide and a salt of silicon oxide. The silicon components (silicon oxides) included in the silicon-containing plant-derived raw material before the carbonization is not substantially changed even if they are carbonized at a high temperature (for example, 400° C. to 1400° C.). Therefore, by the acid or alkali (base) treatment in the next step, the silicon components (silicon oxides) such as silicon dioxide, silicon oxide and a salt of silicon oxide are removed, which results in a large specific surface area value by a nitrogen BET method. In a desirable form of the silicon-containing plant-derived porous carbon material, a natural-based environmentally harmonized material is used. Its microstructure can be provided by treating and removing the silicon components (silicon oxides) included in advance in the silicon-containing plant-derived raw material with acid or alkali. Accordingly, an arrangement of the pores maintains a biological regularity belonging to a plant.

As described above, the raw material of the silicon-containing plant-derived porous carbon material can be the silicon-containing plant-derived raw material. Here, examples of the silicon-containing plant-derived raw material include chaffs or straws such as rice (paddy), barley, wheat, rye, Japanese millet, foxtail millet; coffee beans; tea leafs (for example, leafs of green tea or black tea), sugar canes (specifically, strained lees of sugar canes), corns (specifically, cores of corns); fruit peels (for example, citrus peels such as orange peels, grapefruit peels, mandarin orange peels or banana peels); reed and stem Wakame, but are not limited thereto. Other examples include, vascular plants vegetated on land, pteridophyte, bryophyte, algae and seaweed, for example. The material may be used alone or in combination as the raw material. A shape or form of the silicon-containing plant-derived raw material is not especially limited. The silicon-containing plant-derived raw material may be chaffs or straws themselves, or may be dried one. In addition, in food and beverage processing of beer or alcoholic liquors, the raw material fermented, roasted, or extracted may be used. In particular, in view of recycling industrial wastes, the straws and chaffs after treshing may be desirably used. A large quantity of the straws and chaffs after processing are easily available from an agricultural cooperative association, an alcoholic beverage company, a food company, or a food processing company, for example.

The silicon-containing plant-derived porous carbon material has many pores. The pores includes a "mesopore" having a pore diameter of 2 nm to 50 nm, a "micropore" having a pore diameter of less than 2 nm, and a "macropore" having a pore diameter of exceeding 0 nm. Specifically, the mesopore includes many pores having a diameter of 20 nm or less, and especially many pores having a diameter of 10 nm or less. The micropore includes many pores having diameters of about 1.9 nm, about 1.5 nm and about 0.8 nm to 1 nm. The silicon-containing plant-derived porous carbon material has a pore volume of 0.4 $cm^3/g$ or more, desirably 0.5 $cm^3/g$ or more by a BJH method.

The porous carbon material has a value of a specific surface area by a nitrogen BET method (hereinafter simply referred to as "a value of a specific surface area") of desirably 50 m²/g or more, more desirably 100 m²/g or more, still more desirably 400 m²/g or more in order to provide a better property.

The nitrogen BET method is that an adsorption isotherm is measured by adsorbing and desorbing nitrogen as adsorbing molecules on/from an adsorbent (here, the porous carbon material). Data measured is analyzed based on a BET equation represented by the equation (1). Based on the method, the specific surface area and the pore volume can be calculated. Specifically, when the value of the specific surface area is calculated by the nitrogen BET method, nitrogen is firstly adsorbed and desorbed as the adsorbing molecules on/from the porous carbon material, thereby providing the adsorption isotherm. From the adsorption isotherm provided, $[p/\{V_a(p_0-p)\}]$ is calculated based on the equation (1) or the equation (1') provided by deforming the equation (1), and is plotted to an equilibrium relative pressure $(p/p_0)$. The plot is regarded as a straight line, and a slope s $(=[(C-1)/(C \cdot V_m)])$ and an intercept i $(=[1/(C \cdot V_m)])$ are calculated based on a least-squares method. Then, from the slope s and the intercept i determined, $V_m$ and C are calculated based on the equations (2-1) and (2-2). Further, from the $V_m$, a specific surface area $a_{sBET}$ is calculated based on the equation (3) (see BELSORP-mini and BELSORP analysis software manual manufactured by BEL Japan, Inc., pp. 62 to 66). The nitrogen BET method is a measurement method based on JIS R 1626-1996 "a method of measuring a specific surface area of fine ceramic powder by a gas adsorption BET method".

$$V_a=(V_m \cdot C \cdot p)/[(P_0-P)\{1 \pm (C-1)(p/p_0)\}] \quad (1)$$

$$[P/\{V_a(p_0-P)\}]=[(C-1)/(C \cdot V_m)](p/p_0)+[1/(C \cdot V_m)] \quad (1')$$

$$V_m=1/(s+i) \quad (2-1)$$

$$C=(s/i)+1 \quad (2-2)$$

$$a_{sBET}=(V_m \cdot L \cdot \sigma)/22414 \quad (3)$$

where
$V_a$: Adsorbed amount
$V_m$: Adsorbed amount of monomolecular layer
p: Equilibrium pressure of nitrogen
$p_0$): Saturated vapor pressure of nitrogen
L: Avogadro's number
σ: Adsorbed cross-section area of nitrogen When a pore volume $V_p$ is calculated by the nitrogen BET method, adsorption data of the adsorption isotherm determined is linear interpolated to determine an adsorbed amount V at a relative pressure calculated based on the pore volume, for example. From the adsorbed amount V, the pore volume $V_p$ can be calculated based on the equation (4) (see BELSORP-mini and BELSORP analysis software manual manufactured by BEL Japan, Inc., pp. 62 to 66). Hereinafter, the pore volume based on the nitrogen BET method may be referred to as the "pore volume".

$$V_p=(V/22414) \times (M_g/\rho_g) \quad (4)$$

where
V: Adsorbed amount at relative pressure
$M_g$: Molecular amount of nitrogen
$\rho_g$: Density of nitrogen The pore diameter of the mesopore can be calculated based on the BJH method, for example, as a pore distribution from a pore volume change rate to the pore diameter. The BJH method is widely used as a pore distribution analysis method. When the pore distribution is analyzed based on the BJH method, nitrogen is firstly adsorbed and desorbed on/from the porous carbon material as adsorbing molecules to determine the desorption isotherm. Based on the desorption isotherm determined, a thickness of an adsorption layer and an inner diameter of each pore (twice of a core radius) are determined, when the adsorbing molecules (for example, nitrogen) that filled the pores are desorbed stepwise. Then, a pore radius $r_p$ is calculated based on the equation (5), and the pore volume is calculated based on the equation (6). By plotting the pore volume change rate $(dV_p/dr_p)$ to the pore diameter $(2r_p)$ from the pore radius and the pore volume, a pore distribution curve is provided (see BELSORP-mini and BELSORP analysis software manual manufactured by BEL Japan, Inc., pp. 85 to 88).

$$r_p=t+r_k \quad (5)$$

$$V_{pn}=R_n \cdot dV_n - R_n \cdot dt_n \cdot c \cdot \Sigma A_{pj} \quad (6)$$

where $$R_n=r_{pn}^2/(r_{kn}-1+dt_n)^2 \quad (7)$$

Here,
$r_p$: Pore radius
$r_k$: Core radius (inner diameter/2) when adsorption layer having thickness t is adsorbed on inner wall of pore having pore radius $r_p$ at the pressure
$V_{pn}$: Pore volume when nitrogen is desorbed for the $n_{th}$ time
$dV_n$: Change amount at this time
$dt_n$: Change amount of thickness $t_n$ of adsorption layer when nitrogen is desorbed for the $n_{th}$ time
$r_{kn}$: Core radius at the time
c: Fixed value
$r_{pn}$: Pore radius when nitrogen is desorbed for the $n_{th}$ time. $\Sigma A_{pj}$ represents an integrated value of pore wall surface area from j=1 to j=n−1.

The pore diameter of the micropore can be calculated based on the MP method, for example, as the pore volume change rate to the pore diameter. When the pore distribution is analyzed based on the MP method, nitrogen is firstly adsorbed on the porous carbon material to determine the desorption isotherm. The pore distribution is converted into the pore volume to the thickness t of the adsorption layer (t plotting). Based on curvature of the plot (a change amount of the pore volume to a change amount of the thickness t of the adsorption layer, the pore distribution curve can be provided (see BELSORP-mini and BELSORP analysis software manual manufactured by BEL Japan, Inc., pp. 72 to 73, 82).

The silicon-containing plant-derived porous carbon material precursor is treated with acid or alkali. Specifically, the silicon-containing plant-derived porous carbon material precursor is immersed into an acid or alkali solution, or the silicon-containing plant-derived porous carbon material precursor is reacted with acid or alkali in a gas phase. More specifically, when the precursor is treated with acid, examples of the acid include fluorine compounds such as hydrogen fluoride, hydrofluoric acid, ammonium fluoride, calcium fluoride and sodium fluoride. When the fluorine compound is used, an amount of element fluorine is four times greater than an amount of element silicon in the silicon components included in the silicon-containing plant-derived porous carbon material precursor. A concentration of a solution of the fluorine compound is desirably 10% by mass or more. When the silicon components (for example, silicon dioxide) included in the silicon-containing plant-derived porous carbon material precursor are removed by hydrofluoric acid, silicon dioxide is reacted with hydrofluoric acid as shown in the chemical formula (A) or the chemical formula (B), and is removed as hexafluorosilicate ($H_2SiF_6$) or silicon tetrafluoride ($SiF_4$), thereby providing a porous carbon material intermediate. Thereafter, washing and drying are done.

$$SiO_2 + 6HF \rightarrow H_2SiF_6 + 2H_2O \quad (A)$$

$$SiO_2 + 4HF \rightarrow SiF_4 + 2H_2O \quad (B)$$

When the precursor is treated with alkali (base), examples of alkali include sodium hydroxide. When the alkali solution is used, a pH of the solution may be 11 or more. When the silicon components (for example, silicon dioxide) included in the silicon-containing plant-derived porous carbon material precursor are removed by the sodium hydroxide solution, silicon dioxide is reacted as shown by the chemical formula (C) by heating the sodium hydroxide solution and is removed as sodium silicate ($Na_2SiO_3$), thereby providing the porous carbon material intermediate. When sodium hydroxide is reacted in a gas phase for the treatment, sodium hydroxide is reacted as shown by the chemical formula (C) by heating a solid sodium hydroxide and is removed as sodium silicate ($Na_2SiO_3$), thereby providing the porous carbon material intermediate. Thereafter washing and drying are done.

$$SiO_2 + 2NaOH \rightarrow Na_2SiO_3 + H_2O \quad (C)$$

EXAMPLE 1

Example 1 relates to an electrode material and a secondary cell of the first to third embodiments according to the present disclosure.

The electrode material for the secondary cell in Example 1 is configured of the porous carbon material, and has an absolute value of a differential value of a mass using a temperature as a parameter (|−d(TG)/dt|) provided by thermally analyzing a mixture of the porous carbon material and $S_8$ sulfur at a mass ratio of 1:2 exceeding 0 at 360° C. and 0.016 or more at 290° C. In the following description, "an absolute value of a differential value of a mass using a temperature as a parameter (|−d(TG)/dt|) provided by thermally analyzing a mixture of the porous carbon material and $S_8$ sulfur at a mass ratio of 1:2" is represented simply as "(|−d(TG)/dt|)$_{PC}$". Alternatively, the electrode material for the secondary cell in Example 1 is configured of the porous carbon material, and has the (|−d(TG)/dt|)$_{PC}$ of exceeding 0 in a temperature (called as a "predetermined temperature") where an absolute value of a differential value of a mass using a temperature as a parameter (|−d(TG)/dt|)$_{KB}$ provided by thermally analyzing a mixture of Ketjen black and $S_8$ sulfur at a mass ratio of 1:2. Alternatively, the electrode material for the secondary cell in Example 1 is configured of the porous carbon material, and has the (|−d(TG)/dt|)$_{PC}$ of 0.01 or more at 325° C.

In addition, the secondary cell in Example 1 is configured of the electrode configured of the porous carbon material, and has the (|−d(TG)/dt|)$_{PC}$ of exceeding 0 at 360° C. and 0.016 or more at 290° C. Alternatively, the secondary cell in Example 1 is configured of the electrode configured of the porous carbon material, and has the (|−d(TG)/dt|)$_{PC}$ of exceeding 0 at the predetermined temperature. Alternatively, the secondary cell in Example 1 is configured of the electrode configured of the porous carbon material, and has the (|−d(TG)/dt|)$_{PC}$ of 0.01 or more at 325° C.

In the method of producing the electrode material for the secondary cell in Example 1, the above-described electrode material for the secondary cell in Example 1 is provided by carbonizing a silicon-containing plant-derived raw material at 400° C. to 1400° C., and then treating with acid or alkali.

Specifically, chaffs are used as the silicon-containing plant-derived raw material containing 5% by mass or more of silicon (Si), and carbonized (fired) at 800° C. under nitrogen atmosphere, thereby providing the silicon-containing plant-derived porous carbon material precursor. Next, the silicon-containing plant-derived porous carbon material precursor provided is immersed into a 48 volume % of a hydrofluoric acid solution one night to conduct the acid treatment to remove the silicon components, and washed with water and ethyl alcohol to a pH of 7. Finally, the precursor was dried, thereby providing the porous carbon material. Thereafter, the temperature was increased to 900° C. under nitrogen atmosphere, and the activation by water vapor was conducted to provide the porous carbon material in Example 1A. Next, the porous carbon material in Example 1A was heated to the desired temperature at 5° C./min, and held at the desired temperature for one hour once it reached the desired temperature, thereby providing each porous carbon material in Example 1B, Example 1C, Example 1D, Example 1E and Example 1F. The resultant porous carbon material in each of Example 1A to Example 1F included 1% by mass or less of silicon (Si). In addition, each porous carbon material had a value of a specific surface area by the nitrogen BET method of 10 $m^2/g$ or more, and the pore volume by the BJH method and the MP method was 0.1 $cm^3/g$ or more.

The desired temperature was 1000° C. (Example 1B), 1200° C. (Example 1C), 1300° C. (Example 1D), 1400° C. (Example 1E) or 1500° C. (Example 1F). The resultant porous carbon material was measured for XRD using the X-ray diffractometer (RINT-TTRII) manufactured by Rigaku corporation. Each half-value width in a diffraction intensity peak of a (100) face or a (101) face by an X ray diffractometry is shown in Table 1 below.

TABLE 1

| | Desired temperature | Half-value width |
| --- | --- | --- |
| Example 1A | | 4.8 degrees |
| Example 1B | 1000° C. | 4.8 degrees |
| Example 1C | 1200° C. | 4.8 degrees |
| Example 1D | 1300° C. | 3.9 degrees |
| Example 1E | 1400° C. | 3.9 degrees |
| Example 1F | 1500° C. | 3.0 degrees |
| Example 2A | | 4.8 degrees |
| Example 2C | | 4.9 degrees |

Figure 1:
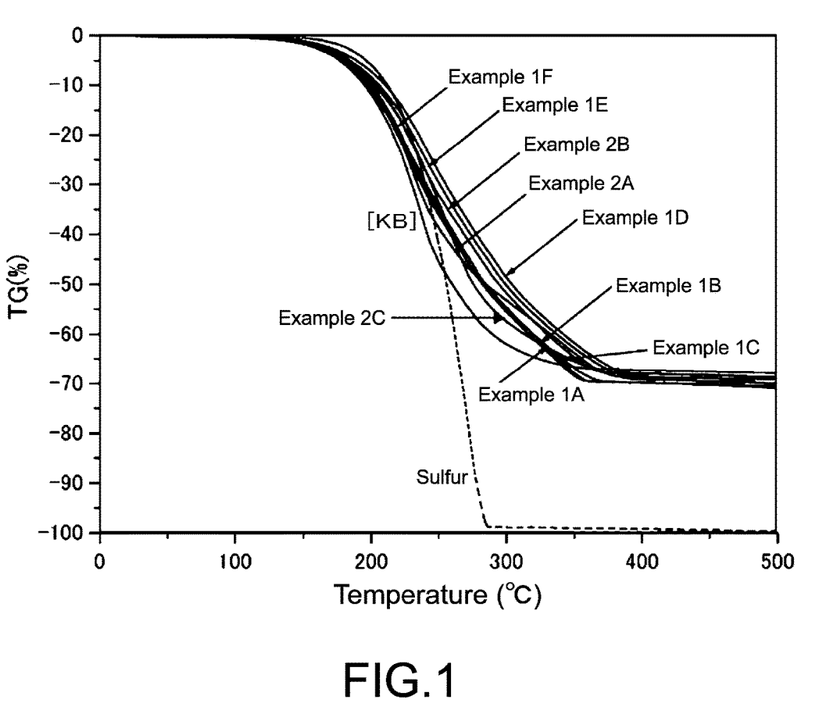
FIG. 1 is a graph showing TG measurement, % versus temperature, results of a mixture of a porous carbon material and $S_8$ sulfur.
Figure 2:
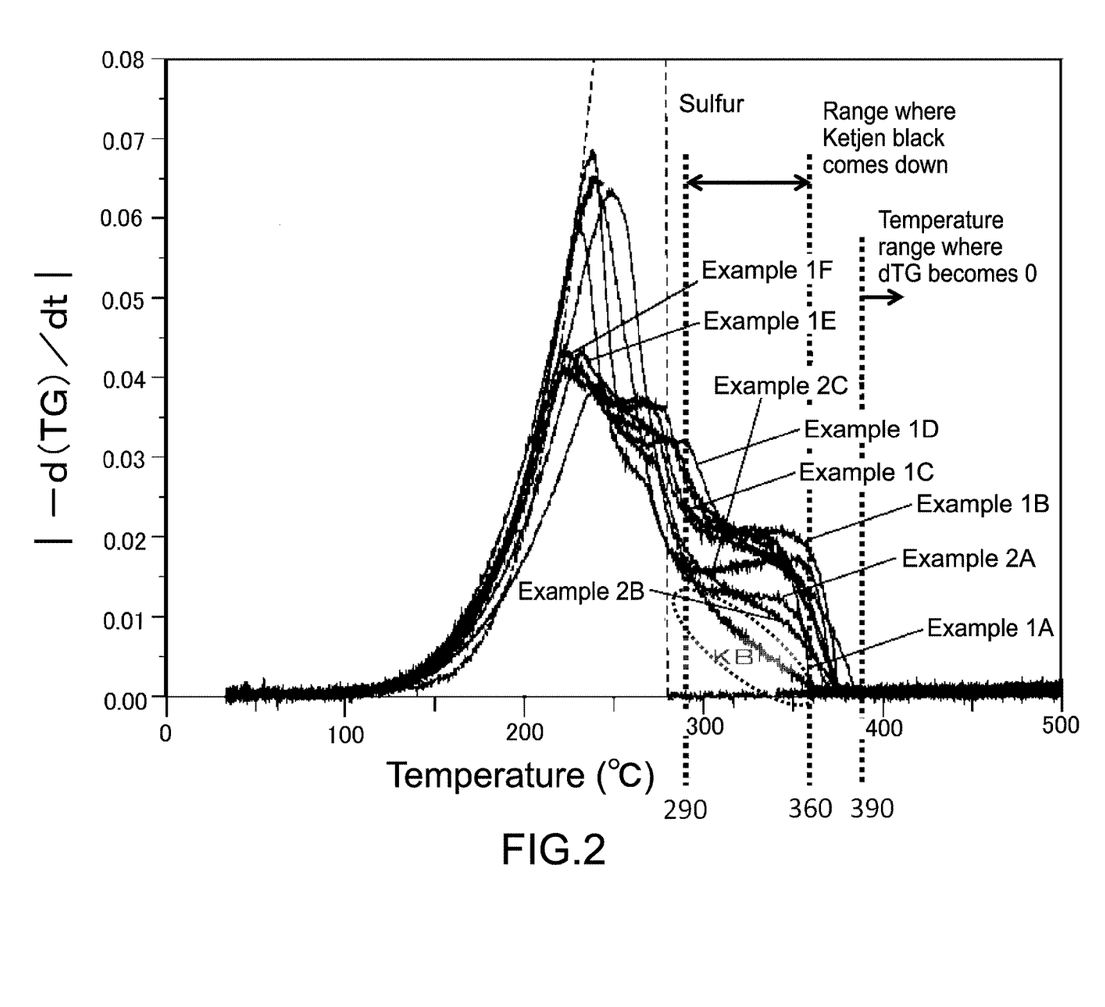
FIG. 2 is a graph of an absolute value of a differential value of a mass using a temperature as a parameter $(|-d(TG)/dt|)$ based on the TG measurement results of a mixture of a porous carbon material and $S_8$ sulfur.

FIG. 1 shows a TG measurement result of a mixture product of the porous carbon material and $S_8$ sulfur in each Example, and also shows a TG measurement result of $S_8$ sulfur and Ketjen black (a product name "carbon ECP" manufacture by Lion Corporation). The Ketjen black may be represented by [KB]. Further, FIG. 2 shows an absolute value of a differential value of a mass using a temperature as a parameter (|−d(TG)/dt|)$_{PC}$. As apparent from FIG. 2, the value of (|−d(TG)/dt|)$_{PC}$ in each Example is higher than the value of (|−d(TG)/dt|)$_{KB}$ of Ketjen black [KB] at 290° C. or more. The value of (|−d(TG)/dt|)$_{PC}$ of each porous carbon material in Example 1 and Example 2 described later exceeds 0 at 360° C., and 0.016 or more at 290° C. as shown in Tables 2, 3, and 4 below. Also, the value exceeds 0 at the predetermined temperature (specifically, 365° C.). Furthermore, the value is 0.01 or more at 325° C.

TABLE 2

| | Desired temperature | $(|-d(TG)/dt|)_{PC}$ Value at 360° C. | Value at 290° C. |
|---|---|---|---|
| Example 1A | 900° C. | 0.001 | 0.020 |
| Example 1B | 1000° C. | 0.005 | 0.025 |
| Example 1C | 1200° C. | 0.011 | 0.023 |
| Example 1D | 1300° C. | 0.015 | 0.032 |
| Example 1E | 1400° C. | 0.011 | 0.028 |
| Example 1F | 1500° C. | 0.010 | 0.027 |
| Example 2A | | 0.004 | 0.017 |
| Example 2B | | 0.004 | 0.017 |
| Example 2C | | 0.016 | 0.016 |
| $S_8$ sulfur | | 0 | 0 |
| Ketjen black [KB] | | 0 | 0.015 |

TABLE 3

| | Desired temperature | $(|-d(TG)/dt|)_{PC}$ Value at desired temperature (365° C.) |
|---|---|---|
| Example 1A | 900° C. | 0.003 |
| Example 1B | 1000° C. | 0.004 |
| Example 1C | 1200° C. | 0.019 |
| Example 1D | 1300° C. | 0.008 |
| Example 1E | 1400° C. | 0.014 |
| Example 1F | 1500° C. | 0.008 |
| Example 2A | | 0.002 |
| Example 2B | | 0.002 |
| Example 2C | | 0.012 |

TABLE 4

| | Desired temperature | $(|-d(TG)/dt|)_{PC}$ Value at 325° C. |
|---|---|---|
| Example 1A | 900° C. | 0.020 |
| Example 1B | 1000° C. | 0.020 |
| Example 1C | 1200° C. | 0.019 |
| Example 1D | 1300° C. | 0.020 |
| Example 1E | 1400° C. | 0.020 |
| Example 1F | 1500° C. | 0.020 |
| Example 2A | | 0.013 |
| Example 2B | | 0.012 |
| Example 2C | | 0.016 |

Table 5 shows measurement results for the pores in the porous carbon materials. In Table 5, the "nitrogen BET method", the "MP method" and the "BJH method" mean a value of a specific surface area by the nitrogen BET method (unit: m²/g), a value of a pore volume by the MP method (unit: cm³/g), and a value of a pore volume by the BJH method (unit: cm³/g). The unit of a whole pore volume is "cm³/g". As a measurement device for determining the specific surface area and the pore volume, BELSORP-mini (manufactured by BEL Japan, Inc.) was used. As one of the measurement conditions, the equilibrium relative pressure (p/p₀) was set to 0.01 to 0.99. Based on the BELSORP analysis software, the specific surface area and the pore volume were calculated. The pore distributions of the mesopore and the micropore were calculated based on the BJH method and the MP method by the BELSORP analysis software by conducting a nitrogen absorbing and desorbing test using the above-described measurement device. Upon the measurement, each sample was pre-treated, i.e., dried for three hours at 200° C.

TABLE 5

| | Desired temperature | Nitrogen BET method | Whole pore volume | MP method | BJH method |
|---|---|---|---|---|---|
| Example 1A | 900° C. | 1472 | 1.18 | 0.646 | 0.733 |
| Example 1B | 1000° C. | 1489 | 1.16 | 0.646 | 0.686 |
| Example 1C | 1200° C. | 1445 | 1.15 | 0.624 | 0.674 |
| Example 1D | 1300° C. | 1438 | 1.19 | 0.589 | 0.780 |
| Example 1E | 1400° C. | 1326 | 0.96 | 0.627 | 0.550 |
| Example 1F | 1500° C. | 1268 | 1.07 | 0.502 | 0.717 |
| Example 2A | | 909 | 1.29 | 0.118 | 1.01 |
| Example 2B | | 882 | 1.36 | 0.103 | 1.13 |
| Example 2C | | 1921 | 1.43 | 0.90 | 0.84 |
| Ketjen black [KB] | | 924 | 1.82 | 0.28 | 1.53 |

The electrode was produced using the porous carbon material, and a lithium-sulfur secondary cell was trial produced. Here, the electrode formed a cathode, and supported sulfur.

Using $S_8$ sulfur, the porous carbon material in Example 1 and other materials, a cathode of a lithium-sulfur secondary cell was trial produced. Specifically, a slurry having a formulation shown in Table 6 below was prepared.

TABLE 6

| | mass % |
|---|---|
| $S_8$ sulfur | 60 |
| Porous carbon material | 27 |
| [KB] | 3 |
| PVA | 10 |

More specifically, the above-described mixture product (cathode material), specifically, including $S_8$ sulfur, each porous carbon material and Ketjen black, was mixed in a mortar, heated at 157° C. for three hours to dissolve $S_8$ sulfur, and was inserted into the pore. Thereafter, 3% by mass of polyvinyl alcohol (PVA) functioning as a binder was added using a dissolved N-methyl pyrrolidone (NMP) solution such that a concentration of PVA is 10% by mass of a solid content, as shown in Table 6. Furthermore, NMP was added as a solvent to adjust the concentration. The mixture was kneaded to be a slurry. Then, the kneaded slurry was applied on an aluminum foil, and dried by hot air at 120° C. for three hours. Next, the dried product was hot-pressed using a hot pressing device under the conditions that a temperature was 80° C. and a pressure of 580 kgf/cm², in order to densify the cathode material, prevent damages caused by being in contacting with the electrolyte, and decrease a resistance value. Thereafter, the hot-pressed product was punched to be a diameter of 15 mm, dried under vacuum at 60° C. for three hours to remove water and the solvent. The thus obtained cathode (cathode material layer) excluding the aluminum foil had a thickness of 50 μm, a mass of 3 mg to 5 mg, and a density of about 0.6 g/cm³. Next, the thus obtained cathode was used to assemble a lithium-sulfur secondary cell that was a 2016 type coin cell. Specifically, the cathode including the aluminum foil and the cathode material layer, the electrolyte, a lithium foil having a thickness of 1.0 mm, and nickel mesh were laminated to assemble the lithium-sulfur secondary cell that was a 2016 type coin cell. The electrolyte was 50 microliters of 0.5 mol LiTFSI/0.4 mol LiNO₃ dissolved in a mixed solvent (a volume ratio 1/1) of dimethyl ether and 1,3 dioxane.

The conditions for a charge-discharge test of the lithium-sulfur secondary cell were shown in Table 7 below.

TABLE 7

| | |
|---|---|
| Current | 0.05 C (0.057 miliampere per 1 $cm^2$ cathode) |
| Cutoff | 1.5 volts upon discharge (constant current discharge) |
| | 3.5 volts upon charge (constant current/constant voltage charge) |

After the lithium-sulfur secondary cell was produced, the cell was discharged to determine a discharge capacity density, and then charged to determine a charge capacity density. The charge-discharge capacity density (unit: miliampere/sulfur 1 g) of the secondary cell provided using the porous carbon material in Example 1A is shown in Table 8 below. In Table 8, Comparative Example 1 is a secondary cell using Ketjen black, product name "carbon ECP", manufacture by Lion Corporation was used instead of the porous carbon material.

TABLE 8

| | First time | | Second time | | Third time |
|---|---|---|---|---|---|
| | Discharge | Charge | Discharge | Charge | Discharge |
| Example 1A | 1060 | 1130 | 1060 | 1130 | 1016 |
| Example 2A | 1268 | 1407 | 975 | 976 | 860 |
| Example 2B | 1208 | 1294 | 991 | 1007 | 896 |
| Example 2C | 904 | 958 | 987 | 1019 | 998 |
| Comparative Example 2 | 754 | 836 | 787 | 804 | 769 |

Table 8 shows that the discharge capacity densities of the secondary cells in Example 1A, Example 2A, Example 2B and Example 2C described later had values higher than the discharge capacity density of the secondary cell in Comparative Example 1. Using the porous carbon materials in Example 1B to Example 1F, a secondary cell was trial produced similar to Example 1, and was charged and discharged to determine the charge-discharge capacity density. As a result, the discharge capacity density of the secondary cells were higher than the discharge capacity density of the secondary cell in Comparative Example 1.

As described above, in the electrode material for the secondary cell in Example 1 and the secondary cell in Example 1, a thermal behavior of the mixture of the porous carbon material and $S_8$ sulfur is defined. In other words, even when a heat is applied, sulfur is difficult to be separated from the mixture of the porous carbon material and $S_8$ sulfur. Therefore, the porous carbon material can surely hold the active material within the pores, and can prevent a reaction product of the active material within the spaces from outflowing from the pores to outside, thereby improving the utilization ratio of the active material and providing an excellent charge-discharge cycle property.

EXAMPLE 2

Example 2 is an alternative of Example 1. In Example 2, the raw material of the porous carbon material was peat and a wood-based material (specifically, sawdust).

In Example 2, the porous carbon material was provided by pre-treating such as heating the peat under an inactive gas (such as nitrogen gas and argon gas) or vacuum at a high temperature, and acid washing (to elute a variety of minerals) after the heating. The porous carbon material was activated to provide the porous carbon material in Example 2A. The activation was the gas activation method. Specifically, a tube-shaped nitrogen atmosphere furnace was used, and water vapor was used as the activator. Under a water vapor atmosphere, the activation was conducted at 900° C. for three hours. Furthermore, the porous carbon material in Example 2A was heated to 1400° C. per 5° C./min, after it reached 1400° C., and the temperature was held for one hour, thereby providing the porous carbon material in Example 2B.

Also, sawdust was activated to provide the porous carbon material. The activation was the gas activation method. Specifically, a tube-shaped nitrogen atmosphere furnace was used, and water vapor was used as the activator. Under a water vapor atmosphere, the activation was conducted at 900° C. for three hours, thereby providing the porous carbon material in Example 2C.

Each half-value width in a diffraction intensity peak of a (100) face or a (101) face in a measurement result of an X ray diffraction intensity of the porous carbon material in Example 2A or Example 2C is shown in Table 1. Each value of $(|-d(TG)/dt|)_{PC}$ of the porous carbon material in Example 2A, Example 2B or Example 2C is shown in Tables 2, 3, and 4. Measurement results of the pore are shown in Table 5.

Also in Example 2, the electrode was produced based on the method similar to that in Example 1, and the lithium-sulfur secondary cell was trial produced. Using each porous carbon material in Example 2A, Example 2B and Example 2C was to trial produce the secondary cell similar to that in Example 1 was produced, the cell was charged and discharged to determine a charge-discharge capacity density (unit: miliampere/sulfur 1 g) shown in Table 8 above.

While the present disclosure is described based on desirable embodiments, it should be understood that the present disclosure is not limited thereto and various alternatives are possible. In Examples, the raw material of the porous carbon material is chaffs. Alternatively, other plants may be used as the raw material. Here, examples of other plants include, for example, straws, reed and stem Wakame, vascular plants vegetated on land, pteridophyte, bryophyte, algae and seaweed, for example. The material may be used alone or in combination. Specifically, the silicon-containing plant-derived raw material that is the raw material of the porous carbon material may be rice straws (for example, Isehikari from Kagoshima), and the porous carbon material is converted into a carbonaceous material (the silicon-containing plant-derived porous carbon material precursor) by carbonizing the straws as the raw material, and then is treated with acid. Alternatively, the silicon-containing plant-derived raw material that is the raw material of the porous carbon material may be rice reed, and the porous carbon material is converted into a carbonaceous material (the silicon-containing plant-derived porous carbon material precursor) by carbonizing the rice reed as the raw material, and then is treated with acid. In the porous carbon material provided by treating with alkali (base) such as a sodium hydroxide solution instead of a hydrofluoric acid solution, the similar results are provided. The method of producing the porous carbon material may be similar to that in Example 1.

Alternatively, the silicon-containing plant-derived raw material that is the raw material of the porous carbon material may be stem Wakame (from Sanriku, Iwate), and the porous carbon material is converted into a carbonaceous material (the silicon-containing plant-derived porous carbon material precursor) by carbonizing the stem Wakame as the raw material, and then is treated with acid. Specifically, the stem Wakame is firstly heated at a temperature of about 500° C., and is carbonized, for example. Before heating, the stem Wakame that is the raw material may be treated with alcohol, for example. As a specific method, the stem Wakame is immersed into ethyl alcohol. In this way, water contained in the raw material can be decreased, and elements other than carbon and mineral components contained in the finally provided porous carbon material can be eluted. The alcohol treatment inhibits gas from generating upon the carbonization. More specifically, the stem Wakame is immersed into ethyl alcohol for 48 hours. An ultrasonic treatment is preferably conducted in ethyl alcohol. Next, the stem Wakame is heated at 500° C. for five hours in a nitrogen gas stream and is carbonized to provide a carbide. By the treatment (pre-carbonization treatment), a tar component that will be generated during the next carbonization can be decreased or removed. Thereafter, 10 g of the carbide is introduced into an alumina crucible, and heated to 1000° C. a temperature increase speed of 5° C./min in the nitrogen gas stream (10 l/min). Then, the carbide is carbonized at 1000° C. for five hours, and is converted into a carbonaceous material (silicon-containing plant-derived porous carbon material precursor), which is cooled to a room temperature. During the carbonization and the cooling, nitrogen gas is continued to be flowed. Next, the silicon-containing plant-derived porous carbon material precursor is immersed into 46 vol % of a hydrofluoric acid solution one night to conduct the acid treatment, and washed with water and ethyl alcohol to a pH of 7. Finally, the precursor is dried, thereby providing the porous carbon material.

The present disclosure may have the following configurations.

[A01]<<Electrode Material: First Embodiment>>

An electrode material for a secondary cell, including a porous carbon material having an absolute value of a differential value of a mass using a temperature as a parameter exceeding 0 at 360° C. and being 0.016 or more at 290° C. provided by thermally analyzing a mixture of the porous carbon material and $S_8$ sulfur at a mass ratio of 1:2.

[A02]<<Electrode Material: Second Embodiment>>

An electrode material for a secondary cell, including a porous carbon material having an absolute value of a differential value of a mass using a temperature as a parameter exceeding 0 provided by thermally analyzing a mixture of the porous carbon material and $S_8$ sulfur at a mass ratio of 1:2 at a temperature where an absolute value of a differential value of a mass using a temperature as a parameter being 0 provided by thermally analyzing a mixture of Ketjen black and $S_8$ sulfur at a mass ratio of 1:2.

[A03]<<Electrode Material: Second Embodiment>>

An electrode material for a secondary cell, including a porous carbon material having an absolute value of a differential value of a mass using a temperature as a parameter being 0.01 or more at 325° C. provided by thermally analyzing a mixture of the porous carbon material and $S_8$ sulfur at a mass ratio of 1:2.

[A04] The electrode material for a secondary cell according to any one of [A01] to [A03], in which the porous carbon material includes a plant-derived material containing 5% by mass or more of silicon as a raw material.

[A05] The electrode material for a secondary cell according to any one of [A01] to [A03], in which the porous carbon material includes a peat or a wood-based material as a raw material.

[A06] The electrode material for a secondary cell according to any one of [A01] to [A05], in which the porous carbon material has a value of a specific surface area of 10 $m^2$/g or more by a nitrogen BET method, and has a pore volume of 0.1 $cm^3$/g or more by a BJH method and an MP method.

[A07] The electrode material for a secondary cell according to any one of [A01] to [A06], in which the porous carbon material has a half-value width of 5 degrees or less based on a diffraction angle of 2θ in a diffraction intensity peak of a (100) face or a (101) face by an X ray diffractometry.

[B01]<<Secondary Cell: First Embodiment>>

A secondary cell including an electrode material, including a porous carbon material having an absolute value of a differential value of a mass using a temperature as a parameter exceeding 0 at 360° C. and being 0.016 or more at 290° C. provided by thermally analyzing a mixture of the porous carbon material and $S_8$ sulfur at a mass ratio of 1:2.

[B02]<<Secondary Cell: Second Embodiment>>

A secondary cell including an electrode material, including a porous carbon material having an absolute value of a differential value of a mass using a temperature as a parameter exceeding 0 provided by thermally analyzing a mixture of the porous carbon material and $S_8$ sulfur at a mass ratio of 1:2 at a temperature where an absolute value of a differential value of a mass using a temperature as a parameter being 0 provided by thermally analyzing a mixture of Ketjen black and $S_8$ sulfur at a mass ratio of 1:2.

[B03]<<Secondary Cell: Third Embodiment>>

A secondary cell including an electrode material, including a porous carbon material having an absolute value of a differential value of a mass using a temperature as a parameter being 0.01 or more at 325° C. provided by thermally analyzing a mixture of the porous carbon material and $S_8$ sulfur at a mass ratio of 1:2.

[B04] The secondary cell according to any one of [B01] to [B03], in which the porous carbon material includes a plant-derived material containing 5% by mass or more of silicon as a raw material.

[B05] The secondary cell according to any one of [B01] to [B03], in which the porous carbon material includes a peat or a wood-based material as a raw material.

[B06] The secondary cell according to any one of [B01] to [B05], in which the porous carbon material has a value of a specific surface area of 10 $m^2$/g or more by a nitrogen BET method, and has a pore volume of 0.1 $cm^3$/g or more by a BJH method and an MP method.

[B07] The secondary cell according to any one of [B01] to [B06], in which the porous carbon material has a half-value width of 5 degrees or less based on a diffraction angle of 2θ in a diffraction intensity peak of a (100) face or a (101) face by an X ray diffractometry.

[B08] The secondary cell according to any one of [B01] to [B07], in which the electrode is configured as a cathode.

[B09] The secondary cell according to any one of [B01] to [B08], including a lithium-sulfur secondary cell, in which the electrode supports sulfur or a sulfur compound.

The invention claimed is:

1. A secondary cell, comprising:
an electrode material, comprising a porous carbon material having an absolute value of a differential value of a mass with respect to a differential value of a temperature exceeding 0 at 360° C. and being 0.016 or more at 290° C. provided by thermogravimetrically analyzing a mixture of the porous carbon material and $S_8$ sulfur at a mass ratio of 1:2,
wherein the secondary cell is a lithium-sulfur secondary cell, and wherein the electrode material supports sulfur or a sulfur compound.

2. The secondary cell according to claim 1, wherein the porous carbon material includes a plant-derived material containing 5% by mass or more of silicon as a raw material.

3. The secondary cell according to claim 1, wherein the porous carbon material includes a peat or a wood-based material as a raw material.

4. The secondary cell according to claim 1, wherein the porous carbon material has a surface area of 10 m2/g or more by a nitrogen BET method, and has a pore volume of 0.1 cm3/g or more by a BJH method and an MP method.

5. The secondary cell according to claim 1, wherein the porous carbon material has a half-value width of 5 degrees or less based on a diffraction angle of 2θ in a diffraction intensity peak of a (100) face or a (101) face by an X ray diffractometry.

6. The secondary cell according to claim 1, wherein the electrode material is configured as a cathode.

* * * * *